(12) United States Patent　　(10) Patent No.:　　US 9,232,031 B1
Shoval et al.　　(45) Date of Patent:　　Jan. 5, 2016

(54) COMPUTING DEVICE COMPONENTS AND ASSEMBLY

(71) Applicant: Amazon Technologies, Inc., Reno, NV (US)

(72) Inventors: Aviv Shoval, Seattle, WA (US); Troy Hulick, Seattle, WA (US); Justin Leong, Seattle, WA (US); Jeffrey Matasek, Seattle, WA (US); Dustin Tiffany, Seattle, WA (US); Shaun de la Fuente, Seattle, WA (US); Kevin Page, Seattle, WA (US); Albert Chua, Seattle, WA (US); Jacob Beatty, Seattle, WA (US); Adam Cybart, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 21 days.

(21) Appl. No.: 14/301,496

(22) Filed: Jun. 11, 2014

(51) Int. Cl.
　　*H04M 1/02*　　(2006.01)
(52) U.S. Cl.
　　CPC .......... *H04M 1/0202* (2013.01); *H04M 1/0264* (2013.01)
(58) Field of Classification Search
　　CPC ....... H04B 1/3833; H01Q 1/243; H01Q 1/242
　　USPC ............... 455/575.1, 575.5, 575.7, 90.3, 128, 455/129; 343/713, 702, 873
　　See application file for complete search history.

(56) References Cited

U.S. PATENT DOCUMENTS

| | | | | |
|---|---|---|---|---|
| 6,353,415 | B1 * | 3/2002 | Ashtiani | H01Q 1/3291 343/713 |
| 2003/0038174 | A1 * | 2/2003 | Jones | G06K 19/02 235/380 |
| 2003/0174091 | A1 * | 9/2003 | Mendolia | B29C 45/14655 343/702 |
| 2003/0174096 | A1 * | 9/2003 | Mendolia | H01Q 1/38 343/770 |
| 2008/0018551 | A1 * | 1/2008 | Cheng | G06F 1/1616 343/873 |
| 2010/0238621 | A1 * | 9/2010 | Tracy | B29C 45/14639 361/679.27 |

* cited by examiner

*Primary Examiner* — Minh D Dao
(74) *Attorney, Agent, or Firm* — Novak Druce Connolly Bove + Quigg LLP

(57) ABSTRACT

The structural rigidity of a device is improved by overmolding one or more layers of the device housing over the antenna components, improving overall wall thickness and avoiding air gaps present in conventional devices. Pull tabs are implemented for battery installation and removal using a stretch-release adhesive connected to the tabs that can hold the battery in place and, upon pulling of the pull tabs, cause the battery to be removable from the device. Camera sensors larger than the camera optics are usable in a device by utilizing only image data captured by those pixels of the sensor that correspond to the appropriate part of the camera optics. Mechanical interlocks can be used advantageously for alignment and connection strength for side soldering. Optical alignment processes are used advantageously in situations such as mounting a device camera relative to an opening of a light absorbing layer on a cover glass sheet.

20 Claims, 11 Drawing Sheets

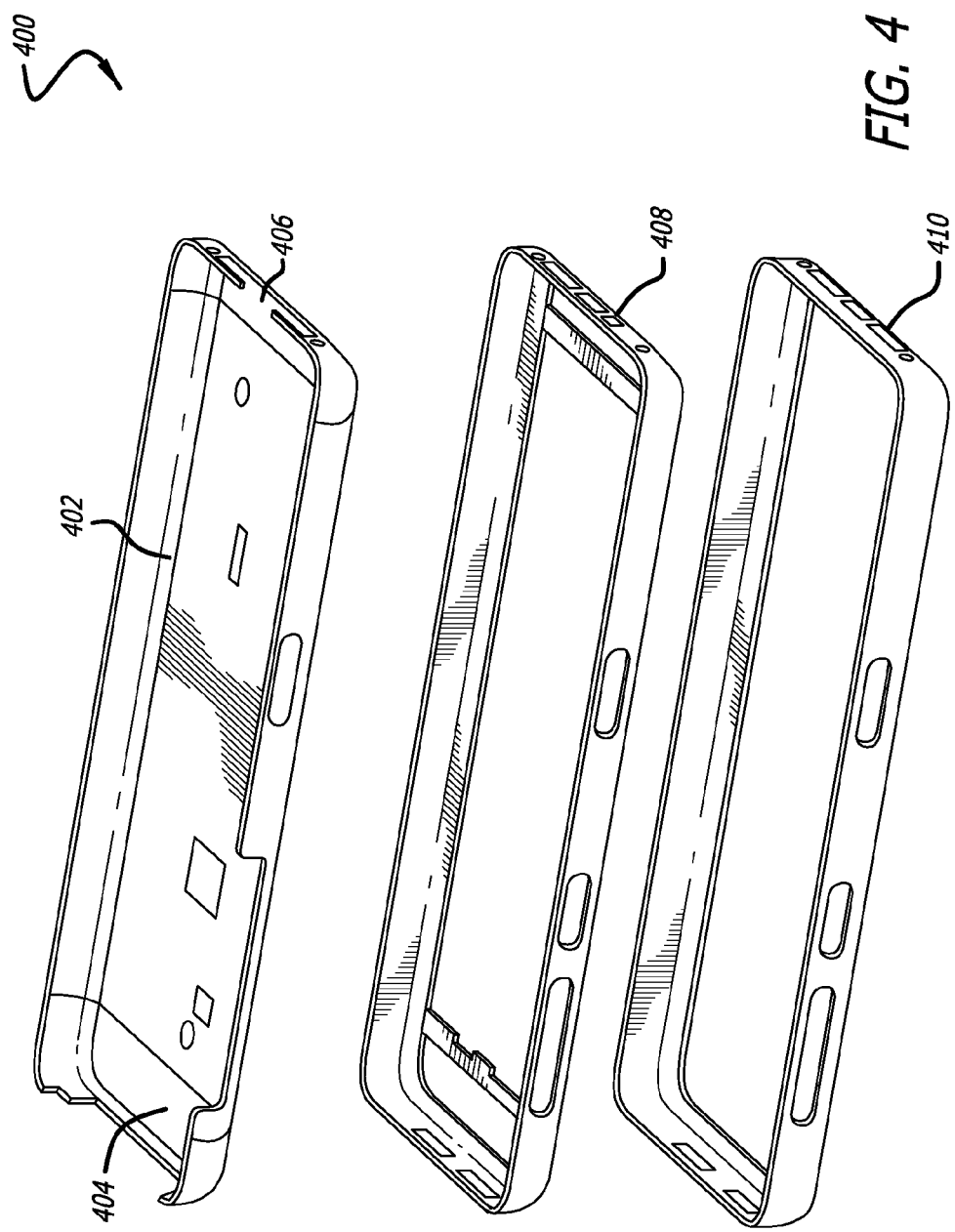

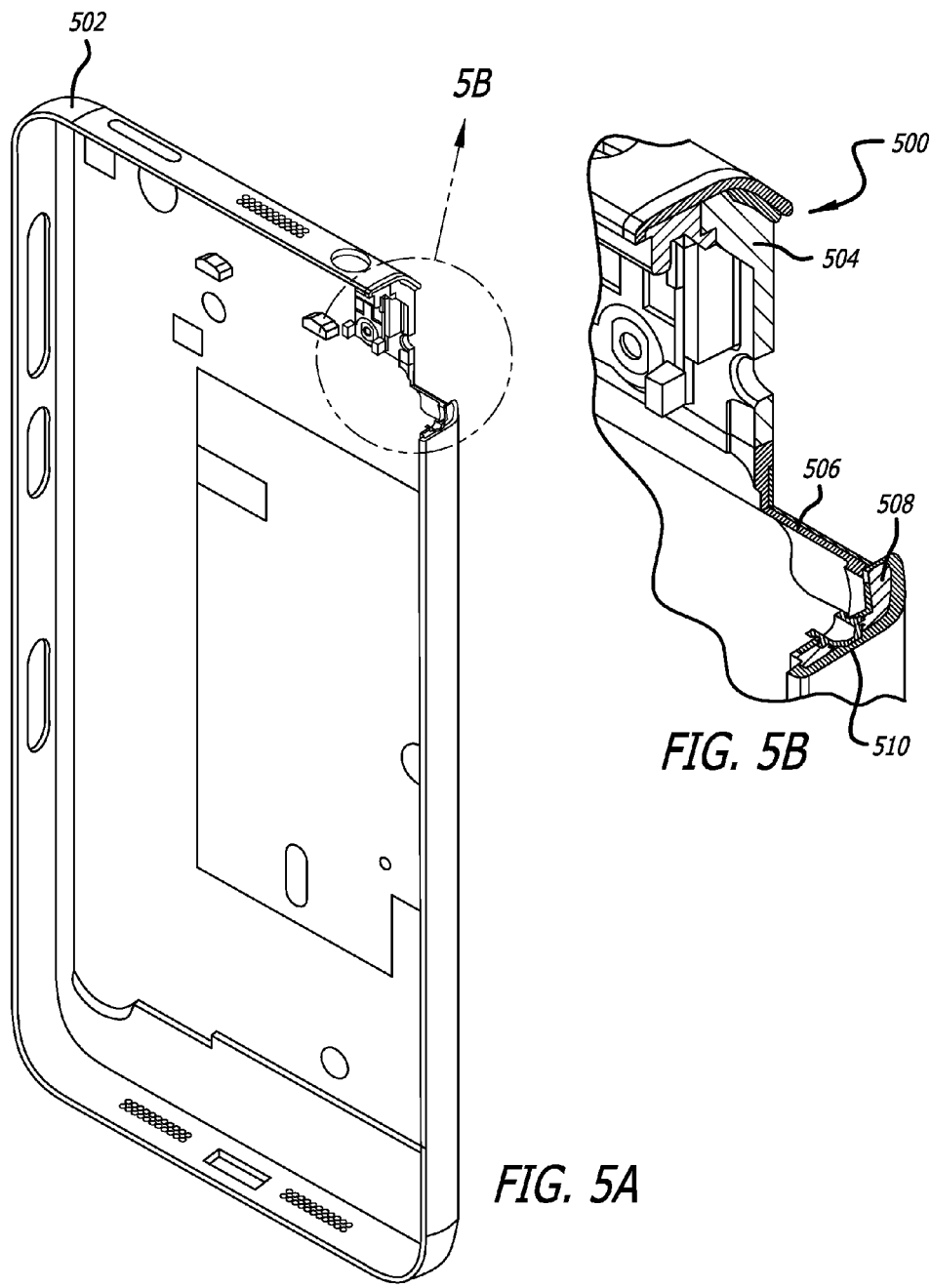

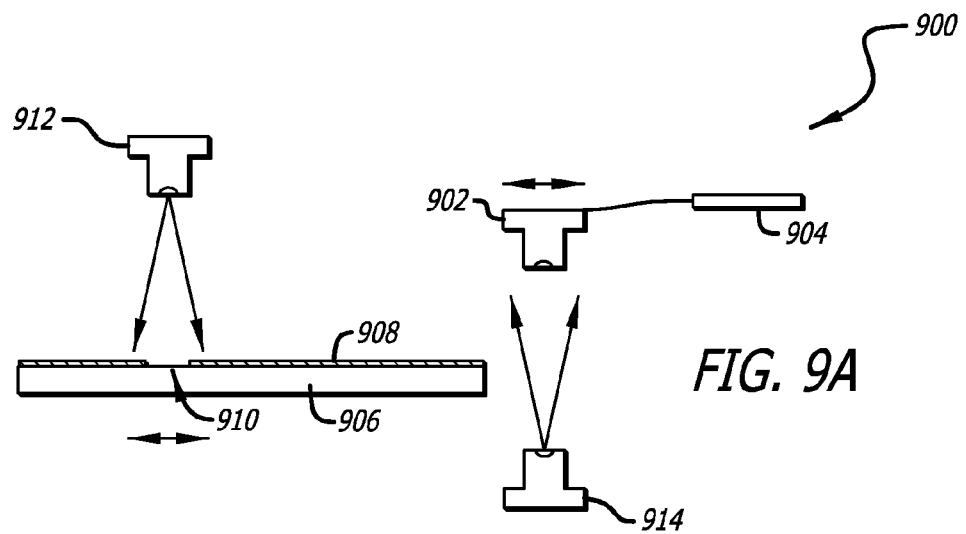
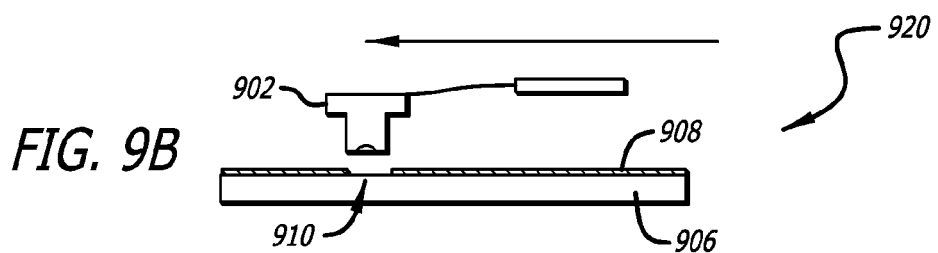
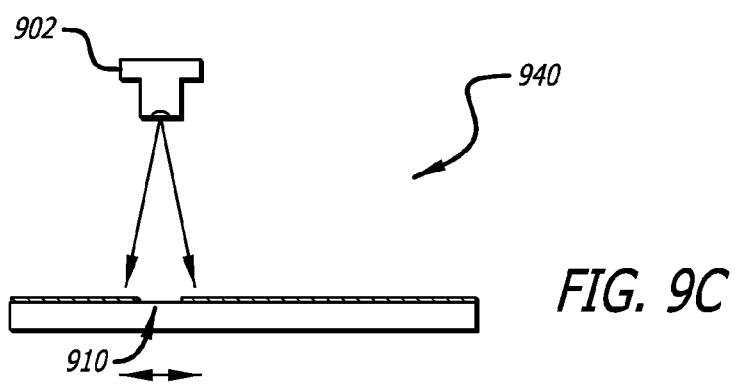
FIG. 9A
FIG. 9B
FIG. 9C

COMPUTING DEVICE COMPONENTS AND ASSEMBLY

BACKGROUND

As users are increasingly relying upon portable computing devices, and are utilizing these devices in an increasing variety of scenarios for an increasing variety of purposes, it can be desirable to further improve the quality and capabilities of these devices. For example, these devices are often dropped or subject to potential stresses, such that it can be desirable to further improve the durability of these devices. It also can be desirable to allow various components to be more easily replaced or upgraded in order to further extend the lifetime of these devices. It also can be desirable to continue to improve the capabilities and accuracy of these devices.

BRIEF DESCRIPTION OF THE DRAWINGS

Various embodiments in accordance with the present disclosure will be described with reference to the drawings, in which:

FIG. 4 illustrates various structural components of a computing device that can be utilized in accordance with various embodiments;

FIGS. 5A and 5B illustrate cross-sectional views of an example device assembly including an antenna component that can be utilized in accordance with various embodiments;

FIGS. 9A, 9B, 9C, 9D, 9E and 9F illustrate example camera alignment processes that can be utilized in accordance with various embodiments;

DETAILED DESCRIPTION

Systems and methods in accordance with various embodiments of the present disclosure overcome one or more of the above-referenced and other deficiencies in conventional approaches to designing, manufacturing, assembling, updating, and/or repairing electronic devices. In particular, various embodiments provide for the design and assembly of components in a way that increases structural rigidity of a portable computing device. Various embodiments also provide for improved installation and removal of components such as device batteries using an improved adhesive design. Various embodiments enable the use of higher resolution camera sensors with lower resolution lenses and other components through design of the assembly components and manipulation of images captured by the sensor. Various embodiments allow for the use of side soldering of elements to a component such as a circuit board through the use of interlaced soldering elements and mechanical connections, which also assist with alignment. Various embodiments also provide for improved alignment of components such as cameras and camera assemblies.

Various other functions and advantages are described and suggested below as may be provided in accordance with the various embodiments.

Figure 1A:
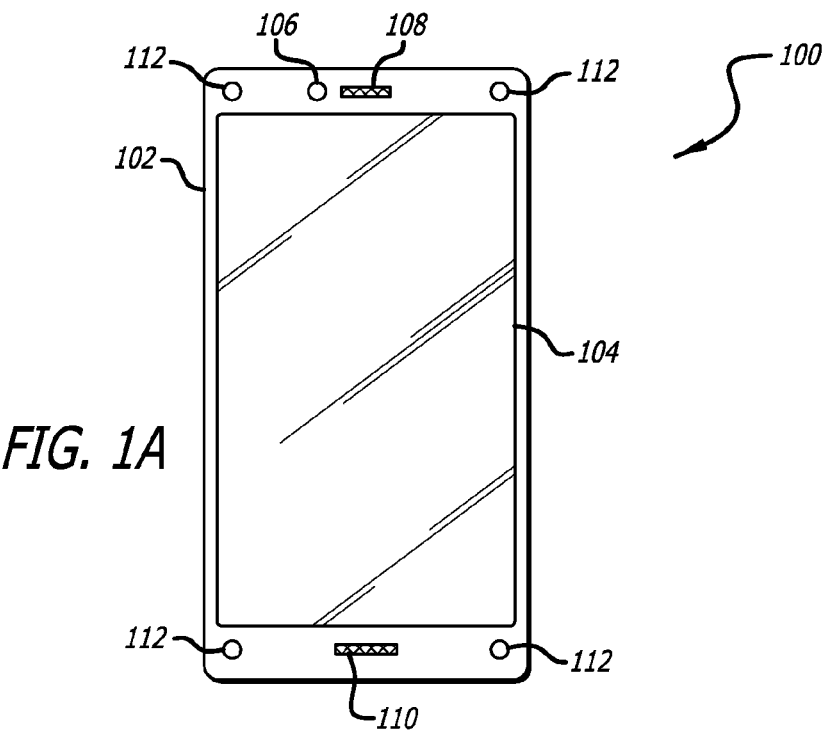
FIGS. 1A and 1B illustrate an example portable computing device that can utilize aspects of the various embodiments.
Figure 1B:
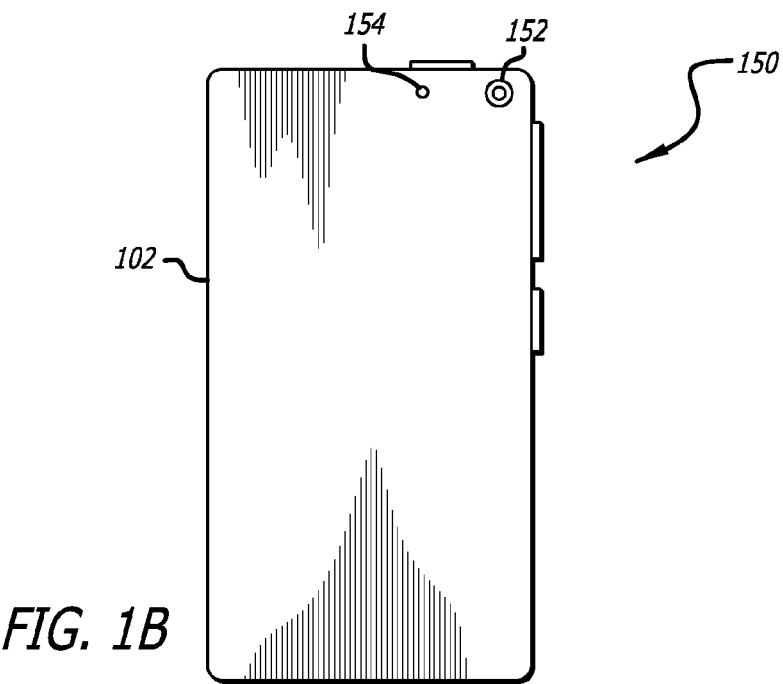

FIGS. 1A and 1B illustrate front and back views, respectively, of an example portable computing device that can take advantage of various embodiments discussed and suggested herein. Although a smart phone is shown, it should be understood that there can be various types of electronic devices that can advantageously utilize aspects of the various embodiments, as may include tablet computers, phablets, electronic book readers, desktop computers, notebook computers, personal data assistants, video gaming consoles, television set top boxes, smart televisions, wearable computers (e.g., smart watches and glasses), portable media players, and digital cameras, among others.

As illustrated in the front view 100 of FIG. 1A, the example smart phone 100 has a display screen 104 on the front side, which under normal operation will display information to a user facing the display screen (e.g., on the same side of the computing device as the display screen). The display screen is typically a touch-sensitive screen, allowing for touch or gesture input, and the display screen 104 can be flush with, or recessed from, the device casing 102 or housing. The housing is typically plastic, although materials such as aluminum, polymers, metal, and glass are used in various devices. The device has a main, front-facing camera 106 which will generally be the primary camera used for taking pictures and/or video of the user during operation. The front-facing camera 106 can generally be a full color, high resolution camera, such as a camera that has 4 megapixel resolution or greater, along with at least 8 bit color depth. The example device also includes a set of relatively low resolution, panchromatic gesture cameras 112, although cameras with capabilities similar to, or even exceeding, the front-facing camera can be used as well within the scope of the various embodiments, among other such possibilities. The gesture cameras can be panchromatic and utilize lower resolution (e.g., 3MP or less) as the gesture cameras can be used for processes such as head tracking and user identification, which can be performed with adequate results using such cameras. The lower resolution, lower color cameras generally are cheaper and require less resources to operate and analyze than cameras such as the front-facing camera. Each camera, or other image capture element, may be, for example, a charge-coupled device (CCD), a CMOS device, a motion detection sensor, or an infrared sensor, among other such possibilities. There can also be fewer or additional cameras, in similar or different locations and of similar or different types, within the scope of the various embodiments. In some embodiments, at least one imaging element can include at least one wide-angle optical element, such as a fish-eye lens, that enables the camera to capture images over a wide range of angles, such as 180 degrees or more. Further, each image capture element can comprise a digital still camera, configured to capture subsequent frames in rapid succession, and/or a video camera able to capture video, such as streaming video. The gesture cameras 112 can be used in pairs to function as stereoscopic cameras, which can be used to determine depth or disparity information, such as may be useful in generating a depth map for an object represented in an image captured by the stereoscopic ("stereo") camera.

The example computing device include at least one microphone 110 or other audio capture device capable of capturing audio data, such as words or commands spoken by a user of the device, music playing near the device, etc. In this example, a microphone is placed on the same side of the device as the display screen, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc. The device also can include at least one speaker 108 for playing audio, such as music, a phone conversation, and the like. As illustrated in the back view 150 of FIG. 1B, the smart phone might also include a back-facing camera 152 for capturing images from the back side of the device. This camera will generally have at least the same capabilities as the front-facing camera, and in many embodiments may have higher resolution. The device can include other components for assisting with image capture and acquisition as well, such as a light sensor 154 for determining an amount of ambient light near the device, a flash element (not shown), and other such components.

Figure 2:
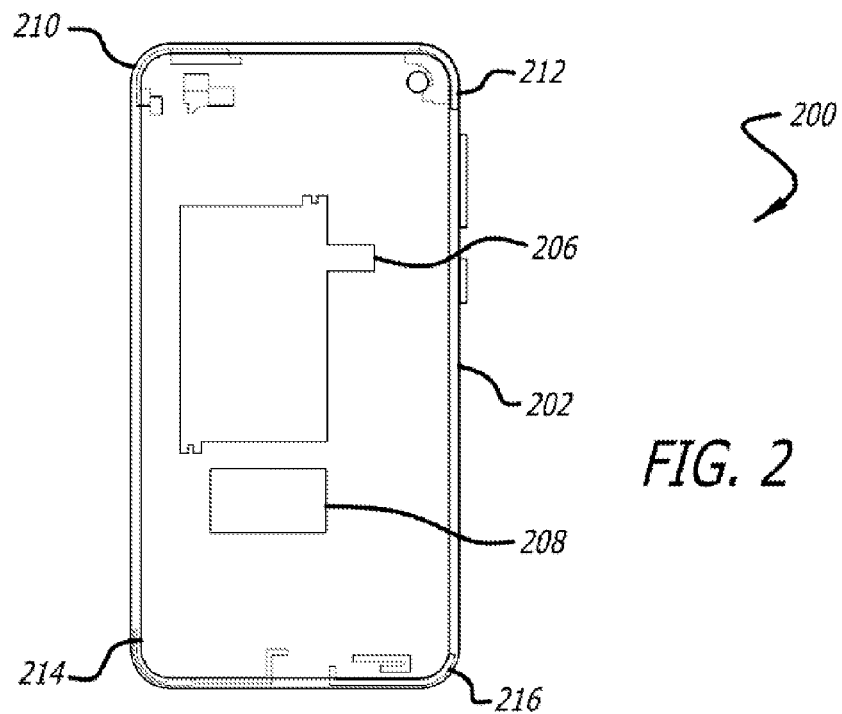
FIG. 2 illustrates example antenna and component placement that can be utilized in accordance with various embodiments.

FIG. 2 illustrates another view 200 of the back of an example smart phone, in this example showing the locations of various highly-integrated antennas inside the device housing 202. As known, a smart phone can utilize different types of antennas for various purposes, such as for Bluetooth communication, cellular communication, Wi-Fi communication, and the like. At least some of these technologies require, or at least advantageously utilize, antenna components that provide specific performance characteristics, such that different antennas are used advantageously. Due to the limited size and space within the device, however, it generally is desirable to make these antennas and antenna assemblies as compact as possible while still providing a minimum level of performance. In this example, the smart phone includes a near field communication (NFC) antenna 206, a radio-frequency identification (RFID) antenna 208, a tunable low band RX diversity antenna 210, a tunable high band RX diversity antenna 212, a tunable high band primary antenna 214, and a tunable low band primary antenna 216. Various other antennas and antenna placements can be used as well within the scope of the various embodiments.

Figure 3A:
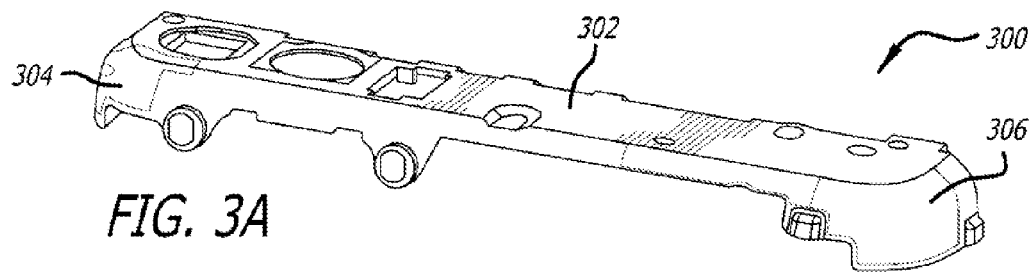
FIGS. 3A and 3B illustrate antenna designs and components that can be utilized in accordance with various embodiments.
Figure 3B:
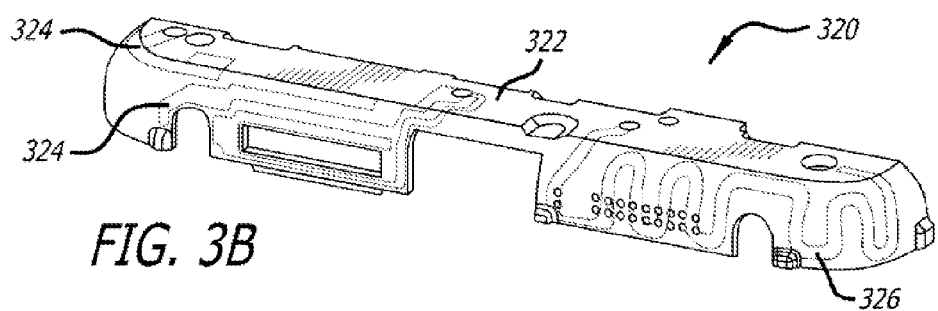

FIG. 3A illustrates an upper antenna assembly 300 and FIG. 3B illustrates a lower antenna assembly 320 that can be used to provide corresponding antennas as illustrated in FIG. 2. The upper antenna assembly 300 includes a molded plastic member 302 with antenna patterns for the low band RX diversity antenna 304 and the high band RX diversity antenna 306. The RX antenna patterns can be used for technologies such as GSM over varying frequencies or frequency bands. The antenna patterns in this example are formed from a selectively plated plastic material. The lower antenna assembly 320 includes a separate molded plastic member 322 with antenna patterns for the low hand primary antenna 324 and the high band primary antenna 326. It should be understood that both members 302, 322 can be made of material other than plastic and/or formed from processes other than molding in various embodiments. In this example, the high and low band RX diversity antennas 304, 306 are insert molded into the respective upper molded plastic member 302, and the high and low band primary antennas 324, 326 are insert molded into the respective lower molded plastic member 322. The antenna material can be insert molded and then laser etched and plated to form the final patterns. The molded plastic members with the antennas formed therein will be referred to herein as upper and lower antenna inserts. Although the patterns shown are example patterns for specific purposes and having specific characteristics, the shapes and materials used for the individual antenna patterns can vary by embodiment.

FIG. 4 illustrates an exploded perspective view 400 of components that can form the back portion of the casing of the device, or the rear housing portion. In this view a metal chassis insert 402 is seen to be mechanically coupled to the upper antenna insert 404 and the lower antenna insert 406. These components can be connected through mechanical connections, soldering, and other such approaches. Once the metal (e.g., aluminum) chassis and antenna inserts are connected, a first plastic housing 408 (e.g., a "first shot") is formed to include the antenna inserts 404, 406 and chassis 402. The first shot is an amount of plastic used to fill a mold cavity, compensating for shrinkage and providing for pressure transfer. Another layer of thermoplastic polyurethane (TPU) 410 is then overmolded over the first plastic housing 408, such as by reinserting the plastic housing in the mold and having the TPU layer formed around the first plastic housing antenna inserts, and chassis. TPU is often used as the outer material of a case or external housing for a portable device such as a smart phone, as it has many useful properties such as elasticity and resistance to oil and abrasion. By forming these layers through overmolding, the antenna inserts, chassis, first plastic housing, and TPU overmold essentially become a single structure. An advantage of such an assembly is that the antennas help to increase the structural rigidity of the assembly versus conventional approaches, such as were the antennas are inserted through mechanical connections (e.g., snaps or screws) alone, which result in a small air gap that does not exist in the illustrated design.

FIGS. 5A and 5B illustrate an example 500 of one such resulting mobile sub-assembly after the components discussed in FIG. 4 are molded together. FIG. 5A illustrates a perspective view of the sub-assembly 502, with FIG. 5B illustrating a more detailed view of a cross-section through a portion of the sub-assembly. The upper antenna 504 is shown to be free from air caps with respect to the upper molded plastic member or first shot plastic overmold 508. The first shot plastic member 508 does not have an air gap with respect to the sheet metal chassis 506 or second shot TPU overmold 510. By overmolding, a chemical bond is effectively being formed between the various layers, which adds to the structural rigidity and stiffness. The lack of air gaps also functions to thicken the effective wall section thickness, by at least two to three times in one example. The additional structural rigidity, particularly near the corners of the device, helps to strengthen the device and prevent breakage upon the device being dropped by a user or otherwise subject to an impact. A potential downside to such an approach is that it can be somewhat more complicated and/or expensive than conventional approaches, but the additional structural rigidity can justify the extra effort for at least some applications. Further, the overmolding approach enables the antenna to be pushed out toward the outside of the device versus conventional approaches, which also improves antenna performance. Parameters such as the locations of the first shot gates and thickness of the first shot material can also be of importance, as placing the gate on top of the antenna pattern can potentially wash the plating off the plastic and/or break the plating. It can thus be desirable to place the gates to be separated a distance from the injection point.

In addition to strengthening such a device, it can be desirable to improve the ability to replace one or more components of such a device. For example, a user (or technician) might want to replace a battery of a computing device for any of a number of reasons. In many portable devices, it is desirable to secure the battery in such a way that the battery does not shake or come loose during movement, which can potentially damage the device or at least lead to rattling or other undesirable effects. As mentioned, however, there is limited space in the device so it can be desirable to make the battery assembly as compact as possible. Further, conventional batteries may exhibit some amount of swelling under certain conditions, so it can be desirable to leave room for this swelling and implement an attachment solution that will not be impacted by such swelling.

Figure 6A:
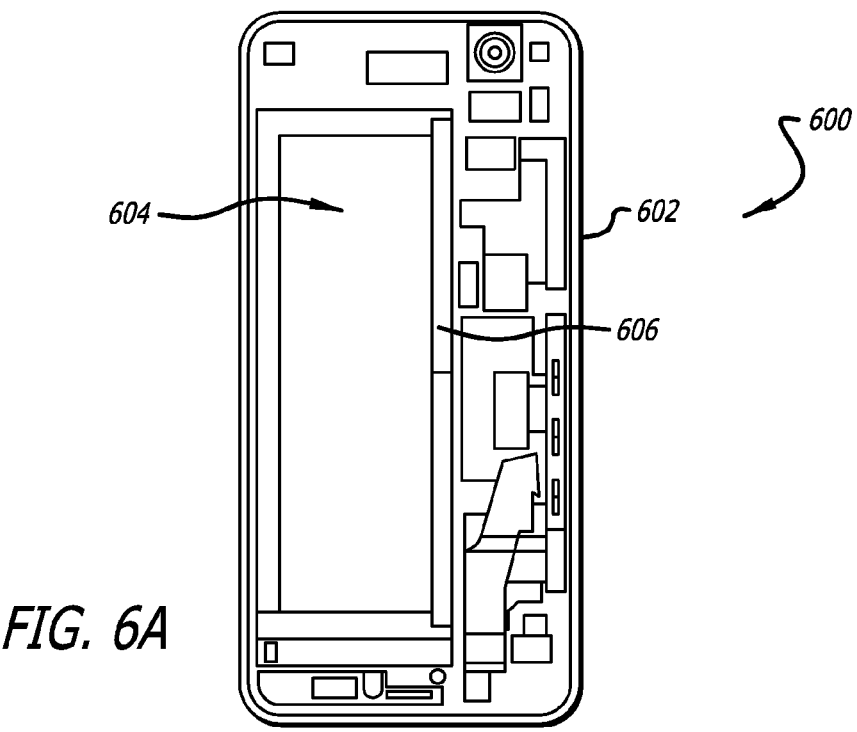
FIGS. 6A and 6B illustrate views of an example pull tab assembly that can be utilized in accordance with various embodiments.

Accordingly, approaches in accordance with various embodiments utilize a stretch-release adhesive with a pull tab-type design to enable the battery to be releasably attached to the device in a way that allows for ease of removal. For example, FIG. 6A illustrates an example situation 600 wherein a battery is attached to the inside of a device using an adhesive material in accordance with various embodiments. In this example, the battery 604 is seen to be inserted into the device 602. Also illustrated is a pair of pull tabs 606 that are attached to the top surface of the battery (in the figure) near an edge of the battery. Although not visible in the figure, the pull tabs are each part of a piece of stretch-release adhesive material that wraps around the right edge of the battery (in the figure) and is also attached to the bottom surface of the battery 604. It should be understood that usage of terms such as "top," "bottom," and "front" are used for purposes of explanation unless otherwise stated, and that various other configurations or arrangements are possible within the scope of the various embodiments. Further, although the adhesive layer is in two pieces in this example, resulting in two tabs, it should be understood that fewer or additional pieces can be used in other embodiments or implementations.

In this example, each of the adhesive pieces is applied to the battery before installation. The adhesive layer in one embodiment is applied to the back of the battery (in the figure) then wrapped around the sides until the tab can be attached to the front surface. In this example, both pieces of adhesive can be applied concurrently, although separate placement can be used as well. Once the adhesive is placed around the edge of the battery, the battery can be positioned in the device. In this example, the back side of the battery that is almost completely covered with adhesive can be placed down against the device, with the tabs facing up or out so as to be accessible to a user once the cover of the device is removed or the interior of the device otherwise accessible. In at least some embodiments, a roller or similar device then can be applied to the exposed surface of the battery (and tabs) in order to apply sufficient pressure to cause the adhesive material to activate and attach the battery to the device, here an exposed portion of the aluminum chassis discussed previously. In at least some embodiments, the pull tabs can be formed of a siliconized pull tape or other such material in order to allow pressure to be applied without causing the pull tabs to be stuck to the battery.

Once the battery is in place and the adhesive activated, the battery should be held in place with sufficient force that significant shock to the device will not jar the battery loose. Further, the design allows for the fastening of the battery without taking up substantial room in the device. As mentioned, however, it is desirable for the battery to be able to be removed from the device. It also can be desirable for the adhesive to be removable as well, in order to replace that adhesive material when inserting a new battery with adhesive material applied. In the layout of FIG. 6A, a user (or other person) can grab one of the pull tabs 606 and pull the tab up and to the right in the plane of the figure. It should be understood that for different placements or orientations the desirable pull directions can be in other appropriate directions. Pulling on the tab will cause the adhesive material to be stretched to the right along the back surface of the battery, until the point where the stretch adhesive releases. If there are two tabs, each can be pulled to release the adhesive, which enables both the battery and the adhesive to be removed from the device. In this example the battery 604 has an elongated shape that might require two hands to pull if a single tab were used, which could be difficult for many users, such that the adhesive layer and tabs are split to provide two separate pieces, which can each be pulled separately using one hand. The amount of force and release direction can depend on factors such as the configuration and type of material. It can be desirable in at least some embodiments to have the tabs be as small as possible, thus requiring less material, occupying less space, while being large enough to be able to allow a person to firmly grab and pull on the tabs. Further, the ability of the pull tabs to wrap around the side of the battery and adhere to, or be positioned proximate to, a relatively small portion of the top of the battery enables the tabs to avoid the swell area of the battery, which provides significant advantage as discussed elsewhere herein. This is provided, in part, by the construction of the adhesive 630 and pull tabs 626 attached to the battery using the pull tab adhesive 624 in this example.

Figure 6B:
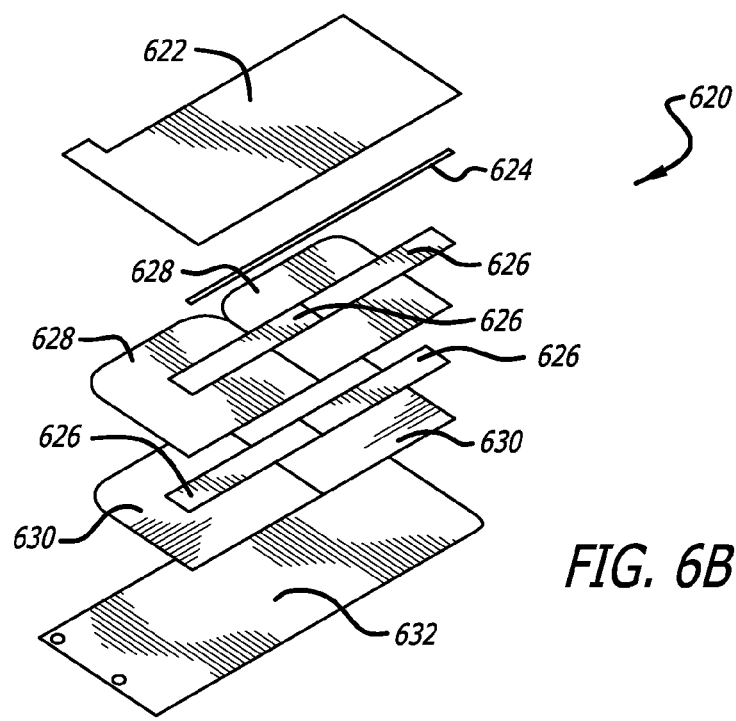

FIG. 6B illustrates an exploded view 620 of a battery assembly that can be utilized in accordance with various embodiments. In this example, a top liner 622, liner strips 630, and alignment layer 632 are used to facilitate the placement and use of the adhesive material, as well as to protect the battery and tabs. A pair of silizonized pull tabs and side members 626 are attached to the adhesive pieces 628, each of which covers approximately half of the back surface of the battery (not shown). In this example, the alignment layer and liner strips would be applied to the device, with the adhesive pieces 628 and pull tabs 626 being attached to the battery, which is then placed on the liner strips 630 and rolled to activate the adhesive. The top liner 622 would then be positioned on the battery and pull tabs for protection. For removal, the top liner 622 would be removed first then a person would pull sequentially (or concurrently) on each of the pull tabs 626 in order to release the respective adhesive piece(s) 630, which would then enable the battery and the adhesive pieces to be removed from the device.

Figure 7:
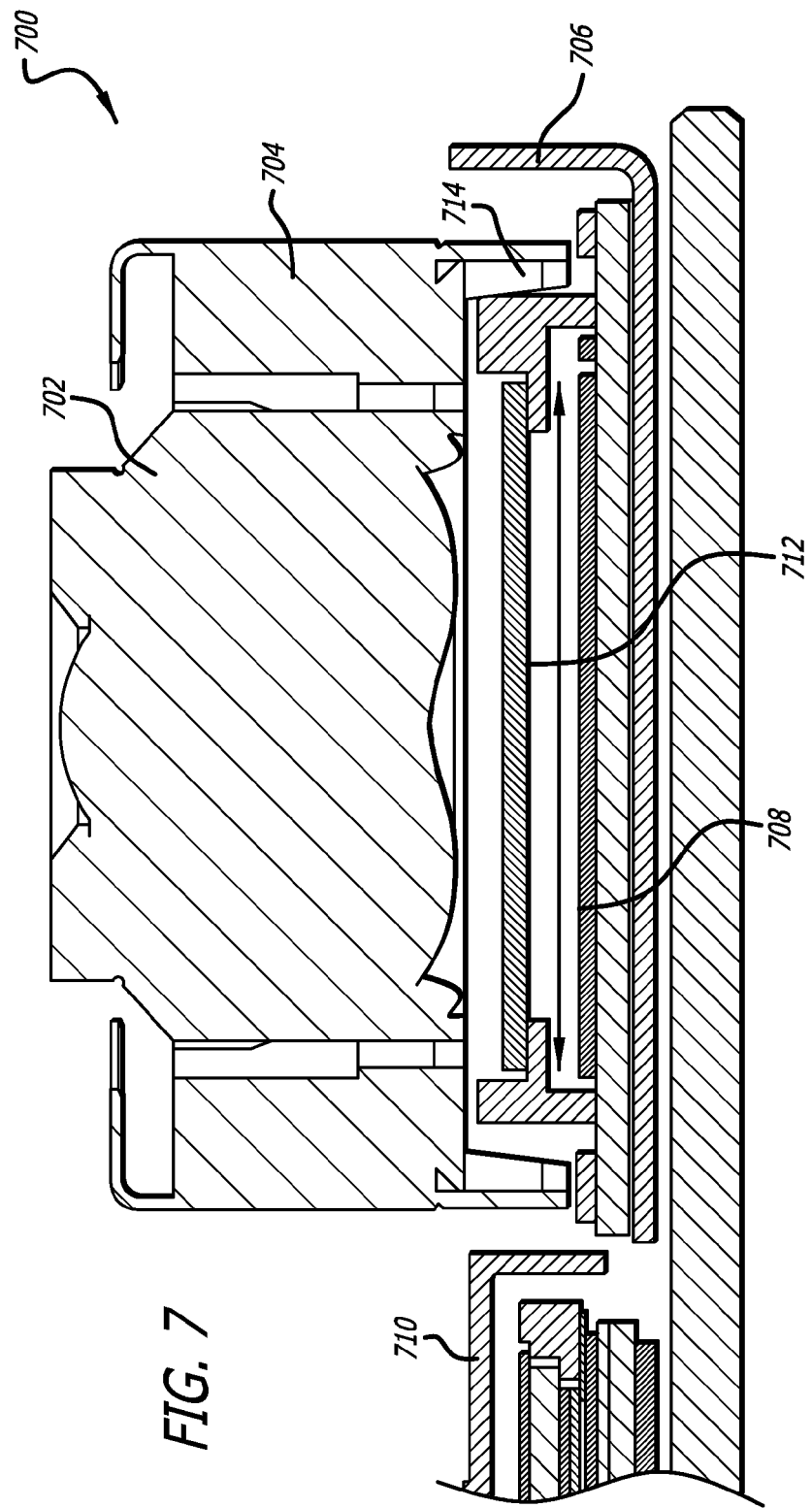
FIG. 7 illustrates a side view of a camera sensor and lens assembly that can be utilized in accordance with various embodiments.

There are various other improvements over conventional devices that can be made without significantly increasing the amount of space needed in the device. For example, the quality of sensors, such as camera sensors, continues to improve. The improvement in quality can address aspects such as resolution and light sensitivity. In the case of many new sensors, however, the size of the sensor can change. For example, FIG. 7 illustrates a situation 700 wherein a camera sensor 708, selected for its low light sensitivity or other such advantage, is desired to be used with a specified lens assembly (e.g., lens barrel). In this case, however, the camera sensor 708 is a larger, 16MP sensor and the lens assembly includes a 13MP lens barrel 702. This can result in at least two potential problems. First, the differences in MP can cause the sensor to attempt to capture light over a larger region than can be provided by the 13MP lens assembly. Further, the larger sensor likely will not fit in the same space as a 13MP sensor. In many instances the sizes of elements such as the lens 702, voice coil motor 704, front housing 706, blue glass 712, and chassis 710 will be relatively fixed or not desirable to change for various reasons, such as volume and space constraints. Accordingly, approaches in accordance with various embodiments can utilize a design with less volume occupied by the support being the voice coil motor 704, as illustrated in the designated area 714. Modifying such a component can enable the existing lens assembly and surrounding components to be utilized while allowing space for a larger camera sensor 708.

While such an approach provides enough physical space for the larger sensor, an image captured by the sensor will still include areas for which the 13MP lens assembly cannot provide adequate light for imaging. It should be understood that any appropriate sizes and differences between the lens assembly and camera sensor can take advantage of at least some aspects of the various embodiments. In many instances, the light from the 13MP lens 702 will be received to a central region of the camera sensor 708, leaving a band of pixels around (or proximate) the outer edge of the sensor that do not receive adequate or direct light, or that would result in the appearance of significant distortions if representing any light received. Accordingly, a determination can be made as to which of the pixels of the sensor correspond to the valid area of light provided by the lens 702. This can be determined once for all devices of similar design or can be determined dynamically through a calibration of each device, among other such options. Once determined, the pixels that correspond to the valid light region can be designated such that when an image is captured by the sensor, data for pixels that are outside of the valid light region can be discarded, similar to "cropping" the captured image to correspond to the valid light region. In this way the larger sensor can be used with the smaller lens assembly while still providing adequate images that do not include regions outside the valid light region.

Another space-saving advantage involves the attachment of various types of shielding or covers to components such a printed circuit boards (PCBs) in the device. For example, shield cans are often soldered or otherwise attached to the top or bottom of the PCB, which takes up valuable space on the PCB. It would be desirable to solder the shield cans to the sides of the PCB, but soldering a can from the top of the PCB to the side typically takes up the space needed to solder a can from the bottom of the PCB as well. One approach that can be taken is to utilize interleaved "fingers," such as the elements 804 illustrated in the example situation 800 of FIG. 8A, wherein separate solder locations are provided on the edge of the PCB for each of the upper and lower cans. For example, an "upward" pointing finger might be used to solder the bottom can 812 to the PCB 810, while a "downward" pointing finger (in the figure) might be used to solder the upper can 802 onto the PCB. The fingers can be separated by a sufficient distance such that the soldering of one finger does not affect the soldering of an adjacent finger.

Figure 8A:
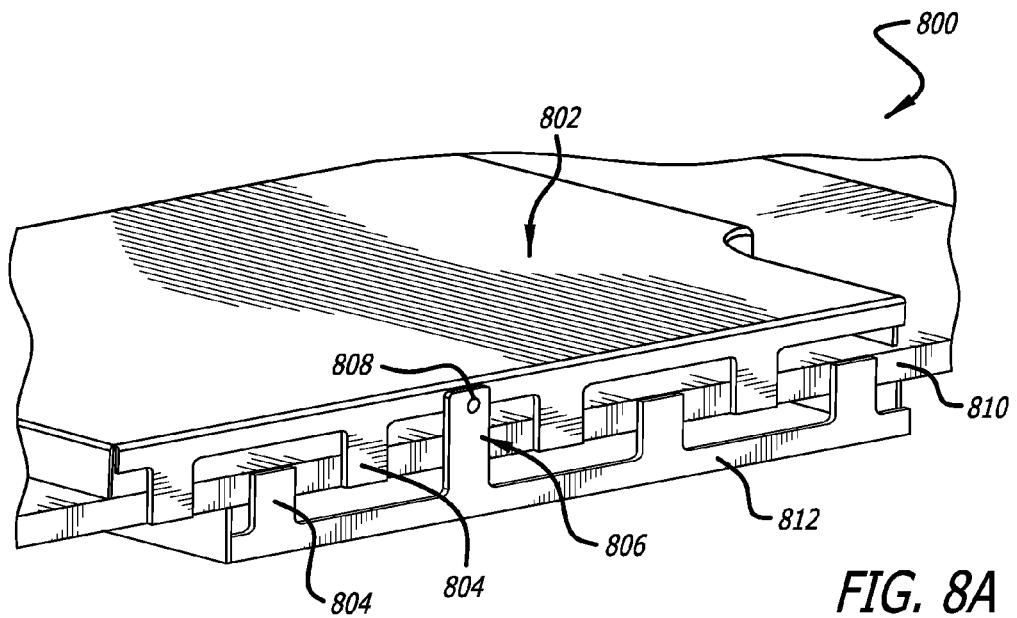
FIGS. 8A and 8B illustrate perspective views of a side assembly approach that can be utilized in accordance with various embodiments.
Figure 8B:
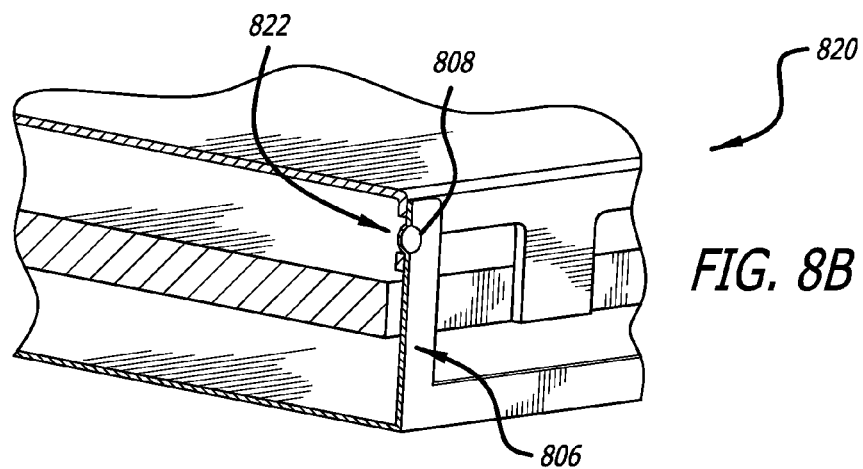

While such an approach can provide for the attachment of the cans with significant space savings on the PCB, it can be desirable to further improve the strength of the connections and ensure that proper alignment is maintained during the soldering process. Accordingly, approaches in accordance with various embodiments can utilize two or more mechanical interlocks to assign with alignment and connection strength. For example, the side view 800 illustrated in FIG. 8A shows that one of the interlaced fingers 806 has a "dimple" 808 or region that is recessed from the outside of the finger 806 and that protrudes from the inside of the finger 806. The protrusion is more clearly illustrated in the example cross-section 820 of FIG. 8B. As illustrated, the dimple 808 can be positioned such that when the lower can 812 is properly positioned with respect to the PCB 810 and upper can 802, the protruding side of the dimple is received into a corresponding opening 822 (or recessed area) of the upper can. Although a protruding dimple and opening are described, it should be understood that any complementary pair of features that can be mechanically coupled in such a way can be utilized as well within the scope of the various embodiments. In at least some embodiments, it is desirable to have such mechanical interlocks on at least opposing sides of the PCB, in order to help align the cans and the PCB to assist with soldering, in addition to increasing the strength of the connection between those components. In some embodiments, at least one such mechanical interlock is utilized on each side of the PCB. In the example situation illustrated in FIG. 8A, the upper can 802 would be attached to the PCB first, then the lower can 812 would be "snapped" into place by moving the lower can until the protruding portion of the dimples of each mechanical interlock is received into the corresponding opening or recess in the upper can. The fingers of the upper and lower cans can be soldered once the corresponding can is in place. In some embodiments, soldering may not be needed although soldering can help to improve the electrical connection of the cans to a ground of the PCB with respect to the mechanical interlocks alone. In some embodiments, the soldering can be performed first, with the mechanical interlock then connected for additional strength. Various other orderings and arrangements can be used as well within the scope of the various embodiments.

Various other components of a smart phone or other electronic device can advantageously utilize improved alignment procedures as well. For example, cameras are often used in devices such as smart phones and tablets, but those cameras are positioned with respect to openings in the "ink," paint layer, color mask, or other light absorbing layer applied to the inner surface of a cover glass layer. It is desirable to have the opening not cover any of the camera lens area at all, in order to prevent any light from being blocked or distortion to be introduced to any image captured by the camera as a result of the light absorbing layer. At the same time, it is desirable for the opening in the light absorbing layer to be as small as possible and as close to the edge of the camera lens as possible for aesthetic reasons, as well as preventing stray light from entering the device for at least some devices. Accordingly, the alignment of the camera to the opening in the light absorbing layer can be important at least for image quality and aesthetic reasons.

Figure 9D:
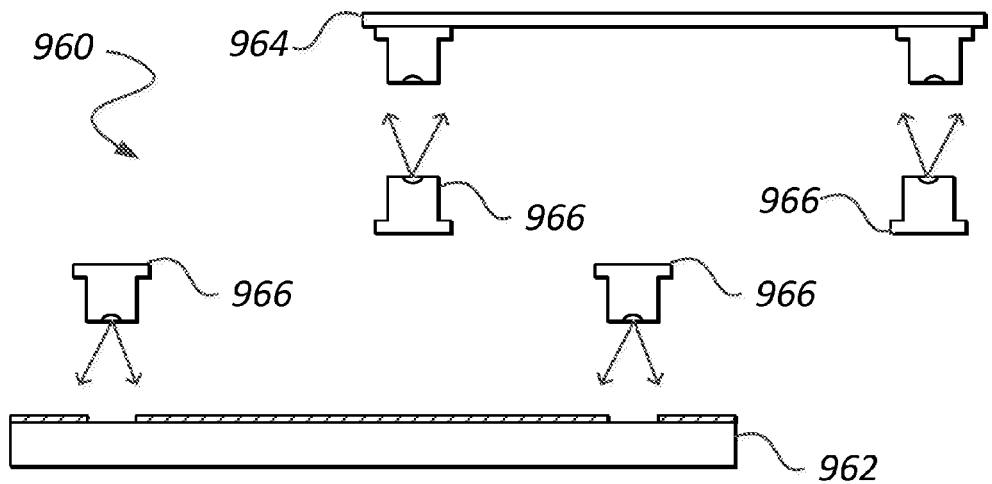

Approaches in accordance with various embodiments can improve the alignment of the camera to the opening in the light absorbing layer on the cover glass by utilizing image data provided by one or more cameras in the alignment process. For example, the example situation 900 illustrated in FIG. 9A shows a device camera 902 (and associated components 904) that is to be installed in a computing device with respect to an opening 910 in a light absorbing layer 908 deposited on the back of a cover glass sheet 906. While the mechanical mechanism (not shown) used to position the camera with respect to the opening may be accurately calibrated, it is possible that there is some offset or improper positioning of the device camera 902 and/or the opening 910 with respect to the mechanism. Any such offset can result in a misalignment of the device camera 902 to the opening 910, which can result in any or all of the deficiencies discussed or suggested above.

Accordingly, approaches in accordance with various embodiments can utilize a pair of alignment cameras to determine one or more offsets for which the mechanical assembly mechanism should compensate. For example, a first alignment camera 912 can be positioned so as to be able to capture an image (or video) showing the position of the opening 910 in the light absorbing layer on the cover glass. If the first alignment camera is properly aligned, then the location of the opening in the captured image (or video) can be compared to a reference image to determine any offset, including the amount and direction of the offset through proper calibration. For example, it might be known that an offset of one pixel in the image corresponds to a tenth of a millimeter in the positioning of the opening. A second alignment camera 914 can be used to capture an image (or video) of the location of the device camera 902 before assembly. While a single alignment camera can be used in some embodiments, the movement needed to make both measurements using a single camera can affect the precision and reliability of the measurements, and can require more frequent calibration. The second device camera can capture an image and that image can be compared to a reference image to determine any offset of the camera in the mechanical assembly mechanism, which will be translated to the assembled device if the camera in its current location is positioned in the device without any offset compensation.

Once the directions and magnitudes of any of the offsets of the opening and the device camera are determined, vector addition (or a similar process) can be used to combine those offsets to determine an overall adjustment that should be made. For example, if the opening is offset by a first amount in a first direction and the camera is offset by a second amount in a second direction, then adding those amounts and directions can provide for the overall misalignment that would result if the camera and cover glass are placed in the device without any adjustment. If the pieces are placed separately, an adjustment (equal and opposite to the determined offset) can be made for each of the device camera and the cover glass when attaching to the device. If the camera is attached to the cover glass, for example, then the overall misalignment can be taken into account and an equal, and opposite, adjustment made to the mechanical mechanism movement to cause the camera to be positioned in the desired location, to within an acceptable amount of deviation. The device camera 902 then can be aligned to the opening in the cover glass using the default position location plus the overall alignment adjustment, as illustrated in the situation 920 of FIG. 9B.

In some embodiments, the device camera itself might be able to be powered up and used to capture images during the assembly process. In such cases, the images from the device camera can be used for alignment instead of, or in addition to, the alignment cameras. For example, in the situation 940 of FIG. 9C the opening 910 is within a field of view of the device camera as the device camera (or cover glass) is being brought into position. In at least some embodiments, the device camera can be configured to capture video (or a series of images) showing the current location of the device camera with respect to the opening. The captured images (or video) can be analyzed to determine any lateral offset between the device camera and the opening. In some embodiments, this can involve determining the center point of the opening and comparing that to a central point of the camera (or captured image), or can involve comparing the location of the opening in the image to a reference image as discussed previously. By using a feedback loop the alignment mechanism can make real-time adjustments as the camera is being brought into position. In some embodiments, the camera might be moved to an alignment position and an offset determined that is used to adjust the positioning of the camera. In others, image data can continue to be analyzed during the alignment process to account for any potential offset through positioning of the camera in the placement mechanism or the motion of the placement mechanism itself, among other such options. Adjustments then can be made as needed to ensure that the camera is aligned to the opening within the acceptable amount of deviation. A final test or calibration image might be captured after placement to ensure proper alignment.

Figure 9E:
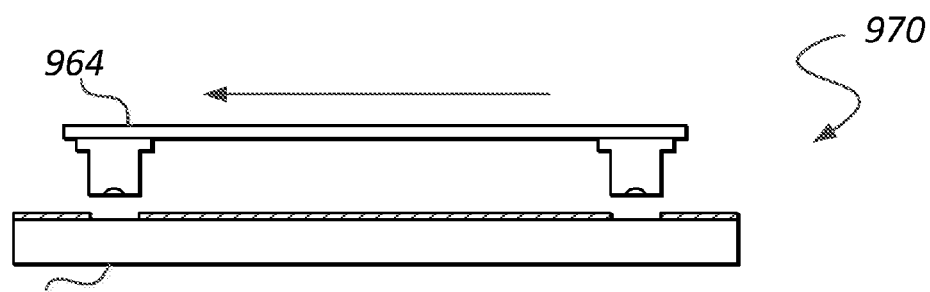
Figure 9F:
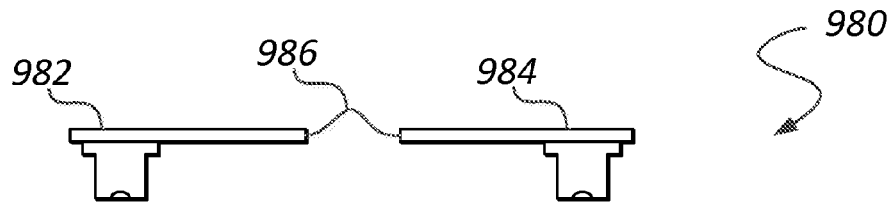

In some embodiments there might be two (or more) cameras that are connected together, such as by a common flex component. An example is illustrated in the situation 960 of FIG. 9D. In this example, two cameras are connected by a common flex component 964 and are to be mounted to a cover glass sheet 962 such that the cameras are aligned with the camera openings discussed previously. In this example, external cameras 966 capture images showing the offsets of the various cameras and camera openings. Although four cameras are shown, it should be understood that fewer or additional cameras can be used as well within the scope of the various embodiments. For such an approach, measurements can be taken in order to determine an offset of either or both of the cameras as well as an offset in either or both of the camera openings in the light absorbing layer on the cover glass 962, or other such feature. In one example, the offsets for the cameras can be determined and then "averaged" in order to attempt to spread any misalignment over the two cameras in order to minimize the offset for either of the cameras. The averaging can be performed in two or three dimensions, and can account for rotations. If the total offset exceeds an allowable threshold, however, the flex with the two cameras might be rejected and another assembly selected. In some embodiments where the alignment of one of the cameras might be more critical, the adjustment can favor the proper alignment of that camera while still accounting at least some amount for the alignment of both cameras. Once the offset is accounted for, the flex 964 with the cameras in place can be moved into position for mounting, as illustrated in the example situation 970 of FIG. 9E. In some embodiments, at least a portion of the flex component can be flexible, as illustrated in the example situation 980 of FIG. 9F. In this example, the flex has two rigid portions 982, 984 for holding the cameras, and a flexible middle portion 986 that allows for changes in the separation of the cameras on the flex. The added flexibility reduces the need for software averaging. The flexibility can be introduced in a number of different ways in various embodiments, such as by adding a bend in the flex, making the flex thinner, reducing the amount of copper in the flex, using a connecting flex member during/after assembly, or adding a service loop to the flex, among other such options.

Figure 10:
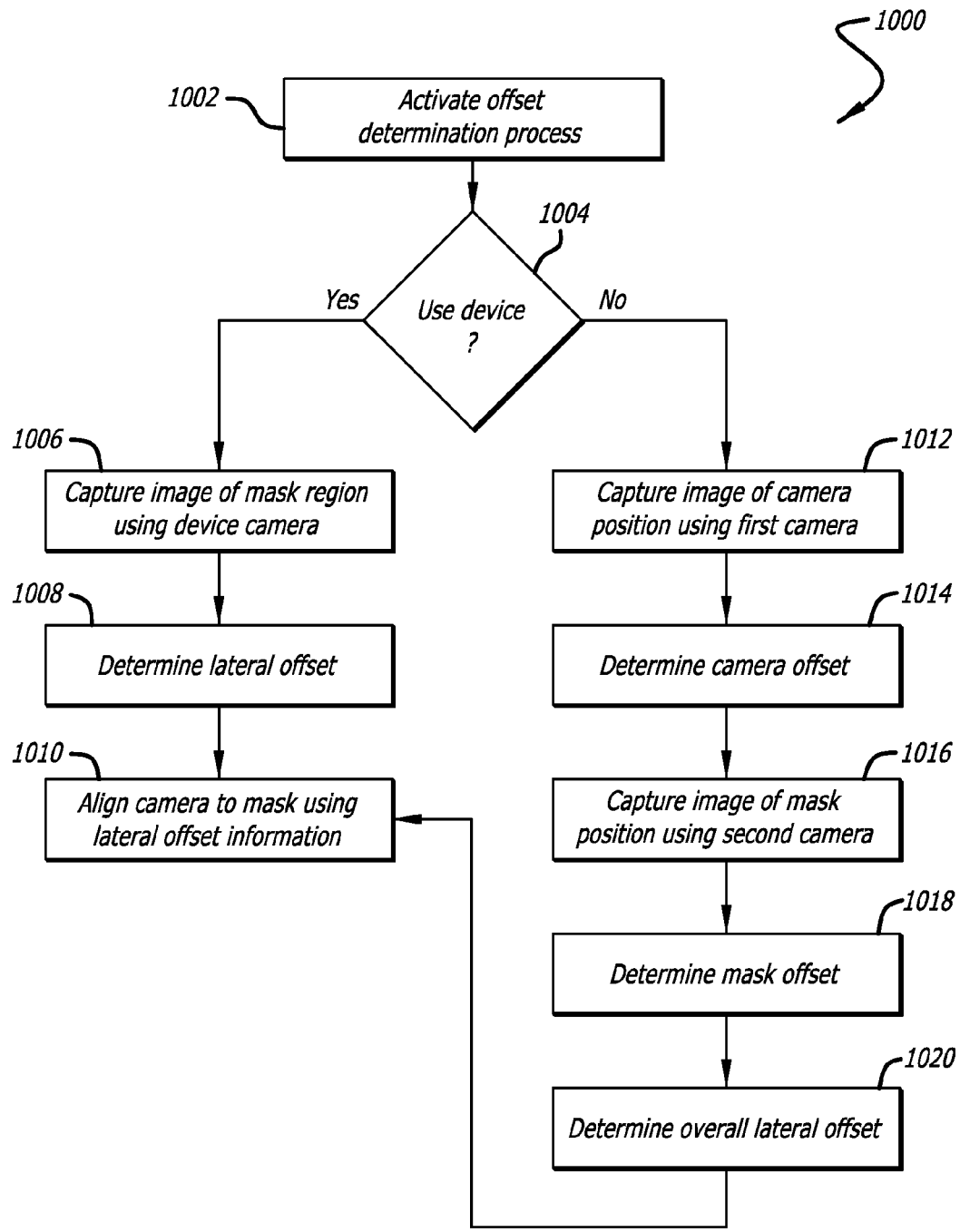
FIG. 10 illustrates an example process for aligning a camera assembly that can be utilized in accordance with various embodiments.

FIG. 10 illustrates an example process 1000 for aligning a device camera to an opening in a light absorbing layer during a mounting process that can be utilized in accordance with various embodiments. It should be understood that there can be additional, fewer, or alternative steps performed in similar or alternative orders, or in parallel, within the scope of the various embodiments unless otherwise stated. Further, such a process can be used with the alignment of various other device components as well in various embodiments. In this example, an offset determination process is activated 1002, such as when a camera assembly is to be mounted to (or otherwise aligned with respect to) a cover glass sheet. If the device camera itself is able to be used 1004, at least one image can be captured 1006 or acquired using the device camera, which can show the mask region or opening in the light absorbing layer with which the camera is to be aligned. The image can be analyzed 1008 to determine any offset between the camera and the opening, and if the offset exceeds an allowable amount then the camera and opening can be aligned 1010 using the offset data. As discussed, in some embodiments multiple images can be acquired and analyzed during the alignment process to account for any offsets that are introduced during the assembly process.

If the device camera is not available for use during the assembly process, at least a pair of alignment cameras can be used to determine any misalignment adjustment to be made. In this example, a first image of the device camera position is captured 1012 using a first alignment camera and the image is analyzed to determine 1014 any device camera offset. A second image of the light absorbing layer or mask opening position is captured 1016 using a second alignment camera and the image is analyzed to determine 1018 any offset in the opening. An overall lateral offset then can be calculated or otherwise determined 1020 by combining any offsets of the device camera and opening. The overall lateral offset data then can be used to align the device camera to the opening as discussed previously. As mentioned, if two or more cameras are connected for purposes of alignment, the relative offset of each of the cameras can be determined and then an overall offset adjustment determined in order to reduce the misalignment while spreading the misalignment across the connected cameras.

Figure 11:
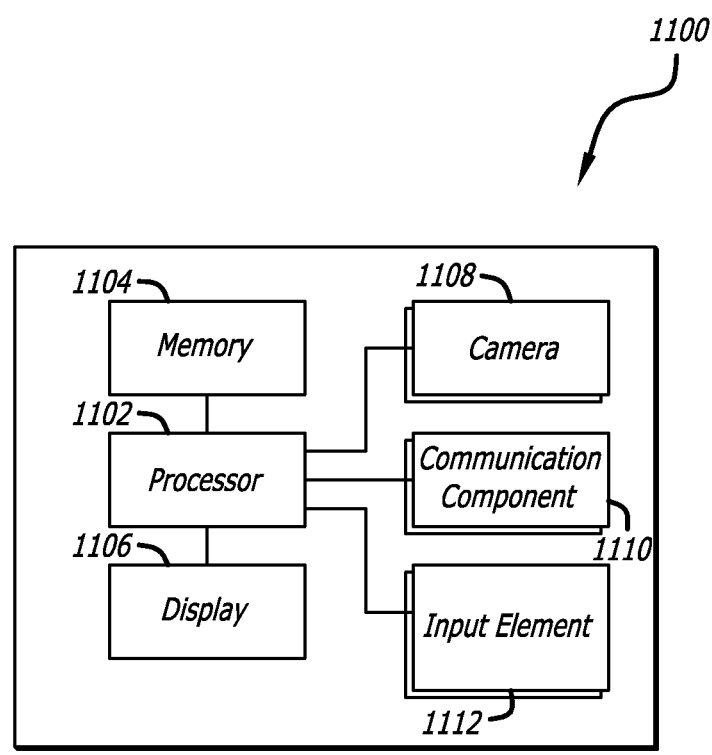
FIG. 11 illustrates example components of a client device that can be utilized with various embodiments.

FIG. 11 illustrates a logical arrangement of a set of general components of an example computing device 1100 such as the device 100 described with respect to FIG. 1A. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one camera 1008 that is able to capture images or video of one or more objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 1100 of FIG. 11 can include one or more communication components 1110, such as a Wi-Fi, Bluetooth, RF, wired, or wireless communication system. The device in many embodiments can communicate with a network, such as the Internet, and may be able to communicate with other such devices. In some embodiments the device can include at least one additional input element 1112 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modern, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and non-transitory computer-readable media for containing code, or portions of code, can include any appropriate media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A portable computing device, comprising:
   a processor;
   memory including instructions executable by the processor;
   a wireless communication component;
   an antenna for use by the wireless communication component, the antenna formed of a plastic, molded into an antenna insert, and having a metal plating thereon;
   a plastic housing member connected to the antenna insert;
   a thermoplastic layer overmolded around a portion of the antenna insert and a portion of the plastic housing member to form a single bonded structure substantially free of air gaps between the antenna and the thermoplastic layer, the thermoplastic layer being chemically bonded to the plastic housing member and forming a back surface of the portable computing device;
   a second housing member connected to the thermoplastic layer; and
   a battery having a first surface and a second surface, the second surface being opposite the first surface, the first surface having a stretch release adhesive layer disposed thereon, a portion of the stretch release adhesive layer positioned around an edge of the battery and including a pull tab proximate the edge of the battery and the second surface, the stretch release adhesive layer adhering the battery to the second housing member, wherein the pull tab is accessible while the battery is adhered to the second housing member, and wherein the pull tab when activated separates the battery from the second housing member.

2. The portable computing device of claim 1, wherein the antenna insert is an upper antenna insert, and further comprising:
   a lower antenna insert over molded by the thermoplastic layer, the lower antenna insert having a different antenna pattern than the upper antenna insert.

3. The portable computing device of claim 1, wherein the stretch release adhesive layer is divided into first and second portions, the first portion being attached to a first half of the first surface of the battery and the second portion being attached to a second half of the first surface of the battery, wherein the pull tab is divided into first and second pull tab portions, the first pull tab portion associated with the first portion of the stretch release adhesive layer and the second pull tab portion associated with the second portion of the stretch release adhesive layer, wherein the battery is released from the portable computing device by pulling the first and the second pull tab portions.

4. The portable computing device of claim 1, further comprising:
   a printed circuit board (PCB);
   a first shield having a first plurality of fingers, the first shield being connected to a first surface of the PCB by the first plurality of fingers being soldered to at least a first side surface and a second side surface of the PCB; and
   a second shield having a second plurality of fingers, the second shield being connected to a second surface of the PCB by a second plurality of fingers soldered to at least the first side surface and the second side surface of the PCB, the second plurality of fingers being interleaved with the first plurality of fingers, at least two fingers of the second plurality of fingers having a mechanical interlock mechanism capable of being received by the first shield in order to align and interlock the second shield to the first shield can.

5. A portable computing device, comprising:
a processor;
memory including instructions executable by the processor;
a wireless communication component;
an antenna for use by the wireless communication component, the antenna formed of a plastic, molded into an antenna insert, and having a metal plating thereon; and
a thermoplastic layer overmolded around a portion of the antenna insert to form a single structure substantially free of air gaps between the antenna and the thermoplastic layer, the single structure forming a back surface of the portable computing device.

6. The portable computing device of claim 5, further comprising:
a plastic housing member connected to the antenna, wherein the thermoplastic layer is a thermoplastic polyurethane material overmolded around at least a portion of the plastic housing member, the portable computing device being substantially free of air gaps between the antenna insert and the thermoplastic layer, the thermoplastic layer being chemically bonded to the plastic housing member.

7. The portable computing device of claim 5, wherein the antenna insert is an upper antenna insert, the portable computing device further comprising:
a lower antenna insert overmolded by the thermoplastic layer, the lower antenna insert having a different antenna pattern than the upper antenna insert, the lower antenna insert, upper antenna insert, and thermoplastic layer together forming an integrated housing for the computing device.

8. The portable computing device of claim 5, further comprising:
a camera lens assembly, the camera lens assembly being designed for use with a sensor having a first resolution;
an image sensor having a second resolution, the second resolution being greater than the first resolution, the image sensor coupled to the camera lens assembly, and wherein an image captured by the image sensor has the first resolution.

9. The portable computing device of claim 5, further comprising:
a cover glass having a light absorbing layer disposed thereon, a camera being mounted proximate a camera opening in the light absorbing layer.

10. The portable computing device of claim 5, further comprising:
a printed circuit board (PCB);
a first shield having a first plurality of fingers, the first shield connected to a first surface of the PCB by the first plurality of fingers soldered to at least a first side surface and a second side surface of the PCB; and
a second shield having a second plurality of fingers, the second shield connected to a second surface of the PCB by a second plurality of fingers soldered to at least the first side surface and the second side surface of the PCB, the second plurality of fingers being interleaved with respect to the first plurality of fingers, at least two fingers of the second plurality of fingers having a mechanical interlock mechanism capable of being received by the first shield in order to align and interlock the second shield to the first shield can.

11. The portable computing device of claim 10, wherein each mechanical interlock mechanism includes a protrusion that extends orthogonally from a surface of a respective finger of the second plurality of fingers, the protrusion capable of being received into a respective recess or opening of the first shield.

12. A method of assembly for a portable computing device, the method comprising:
forming an antenna on an antenna insert;
connecting the antenna insert to a chassis;
providing a plastic housing member, the plastic housing member configured to accept at least a portion of the antenna insert and at least a portion of the chassis; and
overmolding a thermoplastic layer around at least a portion of the plastic housing member to form a single structure substantially free of air gaps between the antenna and the thermoplastic layer, wherein the single structure is a back cover of the portable computing device.

13. The method of claim 12, further comprising:
injecting a plastic material into an antenna region of the antenna insert; and
applying a metal plating to the plastic material to form the antenna.

14. The method of claim 12, further comprising:
applying a stretch release adhesive layer to a first surface of a battery, the stretch release layer having a pull tab that wraps around an edge of the battery to be proximate a second surface opposite the first surface of the battery;
placing the battery with the stretch adhesive layer onto an interior surface of the portable computing device; and
applying pressure to the second surface in order to activate the stretch release adhesive layer and cause the battery to be adhered to the interior surface.

15. The method of claim 12, further comprising:
releasing the battery from the computing device in response to the pull tab being pulled in a determined direction.

16. The method of claim 12, further comprising:
activating a device camera to be mounted in the portable computing device;
acquiring, using the device camera, at least one image showing an offset of the with respect to an camera opening of the portable computing device; and
adjusting the position of the device camera to reduce the offset before mounting the camera proximate the camera opening in the portable computing device.

17. The method of claim 16, further comprising:
acquiring at least one additional image using the device camera while the device camera is being positioned for mounting to the portable computing device; and
adjusting the position of the device camera to reduce any remaining offset during the mounting of the device camera.

18. The method of claim 12, further comprising:
acquiring a first image of a device camera to be mounted proximate a camera opening in the portable computing device;
determining, based at least in part upon the first image, a first offset of the camera device;
acquiring a second image of the camera opening;
determining, based at least in part upon the second image, a second offset of the camera opening;
determining an overall offset based at least in part upon combining the first offset with the second offset; and
adjusting the position of at least one of the device camera of the camera opening to reduce the overall offset before mounting the device camera proximate the camera opening in the portable computing device.

19. The method of claim 12, further comprising:

connecting a first shield to a first surface of a printed circuit board (PCB), the first shield can having a first plurality of fingers capable of being soldered to at least a first side surface and a second side surface of the PCB;

connecting a second shield to a second surface of the PCB, the second shield can having a second plurality of fingers capable of being soldered to at least the first side surface and the second side surface of the PCB, the second plurality of fingers being interleaved with respect to the first plurality of fingers;

aligning the second shield to the first shield using an interlock mechanism positioned on each of at least two fingers of the second plurality of fingers, each mechanical interlock mechanism extending orthogonally from a surface or a respective finger of the at least two fingers and capable of being received by a recess in the first shield in order to position and interlock the second shield with respect to the first shield; and soldering the first plurality of fingers and the second plurality of fingers to the first side surface and the second side surface of the PCB to further attach the first shield and the second shield to the PCB and create an electrical contact to a ground of the PCB.

20. The method of claim 12, further comprising:

positioning a camera lens assembly in the portable computing device, the camera lens assembly being designed for use with a sensor having a first resolution; and positioning a camera sensor to capture light passing through the camera lens assembly, the camera sensor having a second resolution greater than the first resolution, the image sensor coupled to the camera lens assembly, and wherein an image captured by the image sensor has the first resolution.

* * * * *